F. S. CARR.
FASTENER.
APPLICATION FILED NOV. 2, 1917.
1,300,579. Patented Apr. 15, 1919.
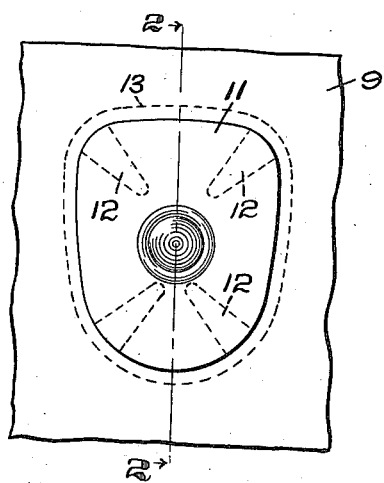
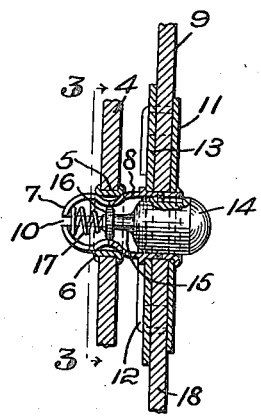
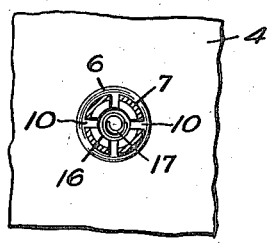
Inventor:
Fred S. Carr,
by Emery Booth Janney-Varney
Attys

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

1,300,579.　　　　　　　Specification of Letters Patent.　　Patented Apr. 15, 1919.

Application filed November 2, 1917.　Serial No. 199,835.

*To all whom it may concern:*

Be it known that I, FRED S. CARR, a citizen of the United States, and a resident of Newton, in the county of Middlesex, Commonwealth of Massachusetts (whose postoffice address is care of Carr Fastener Company, Cambridge, Massachusetts,) have invented an Improvement in Fasteners, of which the following description, in connection with the accompanying drawings, is a specification, like characters on the drawings representing like parts.

This invention pertains to improvements in separable fasteners, and more particularly, though not exclusively, to improvements in fasteners for attaching the curtains of automobiles to sheet metal portions of the car. Among the objects of the invention are to provide a fastener, simply and inexpensive in construction, strong and durable, and which admits of the use of a socket on the body of the car which contains little or no mechanism, and which lies practically flush with the side of the car.

Referring to the drawings, which show one illustrative embodiment of my invention:

Figure 1 is a front elevation of a preferred form of my invention;

Fig. 2 is a section on the line 2—2 of Fig. 1; and

Fig. 3 is a section, partly in elevation, on the line 3—3 of Fig. 2.

In the preferred form of my invention selected for illustrative purposes, I have shown the sheet metal side of a car 4 having an aperature 5 formed therein, this aperture preferably being protected by a gromet 6, and being adapted to receive the head 7 of an expansible and contractile stud 8 secured to a curtain 9.

The stud 8 may be of any suitable construction, but I prefer that it shall be died from a flat sheet of metal, and, for a considerable portion of its length, provided with a slit 10, permitting contraction thereof when the stud is pushed through the gromet 6 and of sufficient resiliency to expand after passing through the gromet 6 so as to hold the stud in firm engagement with the socket.

It is important that that portion of the fastener which is carried by the body of the car contain no mechanism which is likely to get out of order, because the inside of the sheet metal plate 4 is usually concealed behind the upholstery or other interior finish of the car. It is also highly desirable that, as shown, there be little or no projection from that portion of the fastener attached to the sheet metal plate 4, so that the exterior of the car may present a smooth and finished appearance.

The stud 8 may be secured to the curtain 9 in any suitable manner, but I prefer to provide an outside plate 11 having prongs 12 projecting therefrom and adapted to pass through openings in the inside plate 13, about which the prongs 12 may be clenched as shown. While the stud 8 may be maintained in the socket 5 solely by the resiliency of the material of which the stud is made and the tendency of the head 7 of the stud to remain in expanded position, I prefer to provide locking means for holding the head 7 of the stud in expanded position when the stud is entered in the socket. A preferred form of locking means comprises the push-button 14 entered in and longitudinally slidable relative to the stud 8 and provided with a neck 15 and an enlarged portion 16, the latter being normally held by a spring 17 in such position as to prevent contraction of the head 7 of the stud. When the push-button 14, projecting from the outside of the curtain, is pushed, the enlarged locking portion 16 is moved inwardly against the pressure of the spring 17, thereby bringing the locking portion 16 out of contact with the retracted passage in the neck of the stud 8, thereby permitting contraction of the head 7 of the stud and permitting the head 7 of the stud to be pulled through the gromet 6.

The push-button 14 may be very conveniently pressed in during the entrance of the stud into the socket, the pressure required to enter the stud in the socket and the pressure required to move the locking portion 16 inwardly being in the same direction. Thus, when the head of the stud is pressed against the exterier of the socket by pressure on the push-button 14, the same force which causes entrance of the stud into the socket causes, prior to such entrance, the moving of the locking portion 16 out of locking position. When the stud is to be separated from the socket, the bottom portion 18 of the curtain 9 may be grasped and pressure exerted by the thumb on the button 14, thereby permitting very convenient removal of the stud from the socket.

While I have shown and described one embodiment of my invention, it will be understood that changes involving omission, alteration, substitution and reversal of parts, and even changes in the mode of operation, may be made without departing from the scope of my invention, which is best defined in the following claims.

Claims:

1. In a stud and socket fastener, a stud having means for attachment to a curtain, a socket-engaging expansible and contractible head at one end thereof, a locking element opposing contraction of said head in one position while permitting contraction of said head in another position, resilient means tending to maintain said locking means in locking position, and manually operable means located on the opposite side of the curtain from said head for moving said locking means into unlocked position against the pressure of said resilient means.

2. A stud and socket fastener comprising in combination, a socket having unyielding walls, a stud having a head contractible to pass through said socket and resiliently expansible for engagement therewith, locking means for opposing contraction of said head, and means operable when pressure is exerted on said head against the exterior of said socket for moving said locking means out of locking position to permit entrance of said head into said socket.

3. A stud and socket fastener comprising, in combination, a socket having unyielding walls, a stud having a head contractible to pass through said socket and resiliently expansible for engagement therewith, locking means for opposing contraction of said head, means operable when pressure is exerted on said head against the exterior of said socket for moving said locking means out of locking position to permit entrance of said head into said socket, and resilient means tending to maintain said locking means in locked position.

4. A stud and socket fastener comprising, in combination, a socket of fixed dimensions and a stud for coöperation therewith having an expansible head and secured to a curtain, cam means within said stud for normally holding the head thereof in expanded position, and a press button extending axially of said stud and exposed in the opposite side of the curtain from the head of said stud for shifting said cam means out of its normal position thereby to permit the contraction of the head of said stud and removal thereof from said socket.

In testimony whereof, I have signed my name to this specification.

FRED S. CARR.